United States Patent
Jönsson (10) Patent No.: US 8,856,372 B2
(45) Date of Patent: Oct. 7, 2014

(54) METHOD AND SYSTEM FOR LOCAL PEER-TO-PEER TRAFFIC

(75) Inventor: Ulf Fredrik Jönsson, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1431 days.

(21) Appl. No.: 11/914,404

(22) PCT Filed: May 23, 2005

(86) PCT No.: PCT/SE2005/000780
§ 371 (c)(1),
(2), (4) Date: Nov. 14, 2007

(87) PCT Pub. No.: WO2006/126919
PCT Pub. Date: Nov. 30, 2006

(65) Prior Publication Data
US 2008/0195700 A1    Aug. 14, 2008

(51) Int. Cl.
*G06F 15/16* (2006.01)
*H04L 29/08* (2006.01)
*H04L 29/12* (2006.01)
*G06F 15/173* (2006.01)
*G06F 15/177* (2006.01)

(52) U.S. Cl.
CPC ........ *H04L 67/104* (2013.01); *H04L 29/12018* (2013.01); *H04L 61/10* (2013.01); *H04L 29/12811* (2013.01); *H04L 29/12009* (2013.01); *H04L 61/6009* (2013.01)
USPC ........... 709/231; 709/203; 709/220; 709/229; 709/245; 709/246

(58) Field of Classification Search
USPC .................................. 709/231, 246, 203, 245
See application file for complete search history.

(56) References Cited

U.S. PATENT DOCUMENTS

| | | | |
|---|---|---|---|
| 7,293,107 B1 * | 11/2007 | Hanson et al. | 709/245 |
| 2002/0124111 A1 * | 9/2002 | Desai et al. | 709/246 |
| 2003/0076837 A1 | 4/2003 | Whitehill et al. | |
| 2003/0106067 A1 * | 6/2003 | Hoskins et al. | 725/119 |
| 2006/0182120 A1 * | 8/2006 | Lee | 370/395.53 |

FOREIGN PATENT DOCUMENTS

GB    2 403 095 A    12/2004

OTHER PUBLICATIONS

Zhao Liu et al: "A Scalable Wireless Virtual LAN", Mobile Networks and Applications 3, 1998, pp. 261-273, Bell Labs, Lucent Technologies, Holmdel, NJ USA.

* cited by examiner

*Primary Examiner* — Asad Nawaz
*Assistant Examiner* — Stephanie Chang

(57) ABSTRACT

A system and method providing for the flow of peer-to-peer traffic between end users within an access network without requiring the traffic to pass through a network gateway such as a Broadband Remote Access Server (BRAS). End user devices connect through access nodes to an aggregation network and a gateway. An Upstream Address Resolution Protocol (ARP) proxy and a Downstream ARP proxy are implemented in each access node. The Upstream ARP proxy receives an Upstream ARP request and forwards the request upstream only if peer-to-peer communications are allowed. Otherwise, a reply is sent with the MAC address of the BRAS. The Downstream ARP proxy intercepts a Downstream ARP request for a target device and determines whether the target device is in an ARP Cache in the access node. If so, the proxy sends an ARP reply giving the MAC address of the target device. If not, no ARP reply is sent.

6 Claims, 4 Drawing Sheets

METHOD AND SYSTEM FOR LOCAL PEER-TO-PEER TRAFFIC

FIELD OF THE INVENTION

The present invention generally relates to digital communication systems, and more particularly, but not limiting, to a method and system for administering local Peer-to-Peer traffic within an access network, which could be any LAN-network as long as the ARP-protocol (IETF RFC 826) is used to retrieve the MAC address mapped at by an IP-address. One type of net useful in the invention is Ethernet. Ethernet is a packet-based transmission protocol that is primarily used in LANs. Ethernet is the common name for IEEE 802.3 industry specification. Data are transmitted in Ethernet frames, such a frame e.g. is illustrated in FIG. 1 of WO 2004/066589. WO 2004/066589 is here incorporated by reference.

BACKGROUND OF THE INVENTION

The World Wide Web (www), the search system for accessing information is accessible on the Internet, an international network of computers. The "web" actually comprises links to information laid on servers/computers in the network we call the Internet. The public use of the Internet was from the beginning search for information, but has been developed and now functions as e-mail and conference systems. As more and more people and organizations use the internet for communication purposes it is understandable that the traffic demands on the network are high.

Improvements are made to allow more and more traffic over the internet so as to further access to information on the web and also to provide fastness, security and redundancy in the use of the web.

The different functions on the Internet uses agreed protocols. One protocol for example concerns the packaging of information to be sent over Internet, which allows that computer networks from different makers can send small data packets of information over the Net. These data packets are built up according to a standardized format, the Internet Protocol IP, where each package has each globally unique sender and receiver addresses, a declaration of the contents and eventually also a serial number such that the received packages may be counted and acknowledged (TCP/IP). To connect separate computer networks routers are used, which transmits the packages between the networks on the routes set up by the TCP-network.

The concept of Peer-to-Peer (P2P) networking is greatly improving the traffic on the World Wide Web and will possibly soon be one of the more important improvements since the Internet. The reason is that P2P introduces a dynamic network as opposed to the Internet, where the connections are made in a hierarchal manner, i.e. contacts are made upwards in the net until a router/server etc is found where the intended recipient is found downwards. P2P makes possible the connection of hundreds or thousands of computers sharing resources to form a supercomputer with no central administration, except in some of the file search processes. Using P2P, desktops are not just clients on the Internet but are functioning as servers and file depositories.

For this description the following definitions are relevant. A typical Access Network comprises a Gateway for connection of the aggregation network, typically a LAN, to e.g. the Internet, and Access Nodes AN for connection of end user devices, such as PCs, to the aggregation network. Downstream is referred to as the direction of traffic flowing toward an end user device, i.e. that is entering the AN (access node) from the Aggregation Network side. Upstream is referred to as the direction of traffic flowing from the end user device, i.e. that is entering the AN from the end user line side.

P2P differ in many ways from the original concepts used in implementing the Internet, and also many service provider networks. Most striking is the impact pf P2P on network bandwidth. Especially file sharing applications, but also future applications such as Video conferencing consume a lot of bandwidth upstream as well as downstream.

The reason for the impact on the bandwidth is that in today's access networks, i.e. the network/-s one uses for accessing e.g. the web is usually forced to a central point in the network, e.g. a BRAS (Broadband Remote Access Server) to allow the service provider to have full control over the network resources. However P2P traffic is often local in nature, e.g. often files belonging to one client are likely to be accessed by a client attached to the same access network. It is hence not optimal to force this type of local P2P-traffic to the BRAS only to return back to the same access network again, i.e. the file in question is located somewhere in the local network to which the client belongs. The term "local network" is used in the sense of not having to access a BRAS. The obvious reason is that P2P file sharing consumes a lot of bandwidth as the shared information has to pass unnecessarily to an access point that will not be used in the sense that that specific information is staying within the local network.

This however requires that the access network is built to handle this local connectivity and the access network must still be able to preserve the following four essential requirements:

Service access constraints—It must be possible to restrict end-user access to specific services. It must also be possible to put connectivity restrictions on a per service basis, i.e. possibility of allowing/not allowing one or more of the services provided.

End-user traffic separation—Traffic to and from an end-user device, as well as information about the end-user device, must not leak to unintended recipients. It must be possible to prevent traffic hijacking.

Defined QoS (Quality of Service) treatment—It must be possible to ensure that the different services get required QoS, and have control over the network resources.

End-user traceability—It must be possible to determine the physical origin of all upstream traffic.

The impact of P2P on the traffic is shown e.g. by some service providers having taken steps to quantify the impact of the P2P traffic on their networks. Means have been adopted of limiting P2P traffic by inspection of packets or by charging for network usage.

The problems with the existing solutions to the P2P traffic has not been thoroughly studied as regarding to analyzing the impact on the nets which will be used for transporting the traffic. Also today's access networks are not well suited for local P2P as all traffic is forced through a central point, e.g. BRAS, which is not optimized for this type of traffic. The problem is that in the existing solutions the traffic is not allowed to flow directly from one end-user device to another end-user device, which would be much more bandwidth efficient, but is prohibited. The main reason for this is that there is no existing solution for allowing direct communication between end-users while at the same time ensuring the four requirements described above.

SUMMARY OF THE INVENTION

The invention thus is aimed at providing a method and a system, which will allow local Peer-to-Peer traffic to flow directly between end-users within an access network without first passing a network gateway (e.g. a BRAS) in a manner that preserves the properties of today's solutions that force all traffic up to a network gateway.

The solution according to the invention is an introduction of a Downstream ARP Proxy implemented in the access node that handles the end-user ARP request to prevent ARP information from leaking to end-user device. ARP stands for Address Resolution Protocol, which is a section of the TCP/IP which translates IP-addresses like e.g. 128.44.32.41 to a physical network address. The IP address of a device is used to identify the device on the Internet. This address is then on Ethernet translated into a MAC address used for forwarding the data to the right end user. A proxy is a software which substitutes for a device of some type and performs the tasks instead of the tasks being handled by the device which in reality was addressed.

Further according to the Invention an enhanced Upstream ARP proxy is introduced that makes the first check of the end-user ARP-request. The Upstream ARP proxy is located in each access node.

The Downstream and Upstream ARP proxies, together, control whether local P2P traffic should be allowed between two devices or whether the traffic should be forced through the network gateway.

The invention also provides Access Node snooping of ARP replies to associate the source and target devices MAC and/or IP addresses with each other, and store this association in a P2P table in respective Access Node.

The invention also provides for filtering of frames so that upstream frames are only forwarded if they are either destined to a network gateway (BRAS) or destined to an end-user device (target device) where an entry in the P2P-table exists for that <Source Device, Target Device> pair. All other frames are dropped.

The invention also provides for separating local P2P traffic onto a dedicated P2P VLAN (Virtual Local Area Network), which separates the P2P-traffic from other end-user traffic by adding a dedicated VLAN tag for local P2P to all frames that are destined to a device belonging to the defined VLAN and that are not filtered out using a number of filters described below (if the filters are enabled.) Other traffic will be directed to the BRAS Another modification provided for is designing a VLAN such that the end devices allowed to perform local P2P belongs to one LAN and the end devices not allowed to perform local P2P belongs to another LAN. In this embodiment the two LAN's may share the same Gateway.

The invention separates the handling of local Peer-to-Peer communication from other services that can be handled by MAC-Forced Forwarding. Melsen T., MAC-Forced Forwarding, A Method for Traffic Separation on an Ethernet Access Network. The MAC-address which is used in this forwarding is a short for Media Access Control Address which is a hardware address which uniquely defines every node in a network. This address is programmed in the network card by the manufacturer.

The method according to the invention and the MAC-Forced Forwarding can co-exist. The invention is mainly intended for Best Effort P2P traffic, but this should not be seen as a hindrance to apply the principles of the method to P2P traffic with other Quality of Service requirements.

The invention has the following benefits:
The invention provides;
service access constraints—it must be possible to restrict end-user access to specific services and put connectivity restrictions on a per service bases.

end-user traffic separation—Traffic to and from end-user devices as well as information about the same devices must not leak to unintended recipients. It must be possible to prevent traffic hijacking;
for defined QoS treatment;
end-user traceability—it must be possible to determine the physical origin of all upstream traffic; without having to force all traffic through a central gateway (BRAS)—No existing P2P-solution does this.

The invention also provides for bandwidth efficiency.

The invention provides for no leakage of ARP information—The downstream ARP Proxy intercepts all ARP requests these are not sent out on the end user/subscriber lines. This prevents unintended end-users from learning the MAC addresses of other end-user devices.

The invention also solves the layer 2 security issues that have to be solved in order to facilitate local P2P communication in a Public Ethernet access network, e.g. an aggregation network. (Aggregation network is a term used in connection with broad band access.)

BRIEF DESCRIPTION OF THE DRAWINGS

These and other objects, advantages and features of the present invention will be more readily understood from the following detailed description of the preferred embodiments thereof, when considered in conjunction with the drawings, in which like reference numerals indicate identical structures throughout the several views, and wherein:

FIG. 2 $a+b$ shows schematically flow charts showing a downstream ARP request according to the invention.

FIG. 3 $a+b$ shows schematically flow charts showing an upstream ARP request according to the invention.

The embodiments shown in the drawings are not to be considered restrictive of the invention merely showing how the invention may be implemented.

DETAILED DESCRIPTION OF THE PREFERRED EMBODIMENTS OF THE INVENTION

The Downstream and Upstream ARP Proxies will now be described, with reference to an aggregation network and its connection to a Broadband and to e.g. Internet. Also describe will be how most of the layer 2 security issues can be solve and how to enable a fair handling of best effort traffic in a network where local Peer-to-Peer, P2P, is allowed. Finally will be described how the invention works when using a VLAN (Virtual Local Area Network) dedicated to local P2P traffic in the access network Referring now to FIG. 1, it illustrates an example access network where the present invention is applicable. In the figure is shown two end user devices D1 and D2, each connection to respective AN1 and AN2. These AN:s (Access Node) may be, e.g. DSLAMs (Digital Subscriber Line Access Multiplexer, a unit in a telephone exchange which connects several DSL connections for forwarding of data to Internet). AN1 and AN2 connect to the Aggregation Network 10, i.e. a local network serving a number of access nodes and which in turn has a Gateway 20, e.g. BRAS (Broadband Remote Access Server), which connects to e.g. the Internet 30.

When a broadcast or unicast ARP request is forwarded onto the aggregation network 1 by any device D via the corresponding AN the ARP request is intercepted by all access nodes (AN) belonging to the same layer 2 broadcast domain (shown as the Aggregation Network in FIG. 1) and it is handled locally by means of a Downstream ARP Proxy (the proxies according to the inventions are functions implemented in the access nodes). These proxies according to the invention will prevent ARP information from leaking to the end user/subscriber lines and in that way from reaching unintended recipients, which must be avoided for the following reasons:

ARP requests provide end-users with IP and MAC address information of the sender of the ARP request, which information should not be retrieved by unintended recipients.

ARP replies are inherently not secure, since there is no network element that can confirm that the reply of the subscriber is actually valid.

ARP increases the number of control messages sent on the subscriber lines without adding value for the subscriber.

Figure 2A:
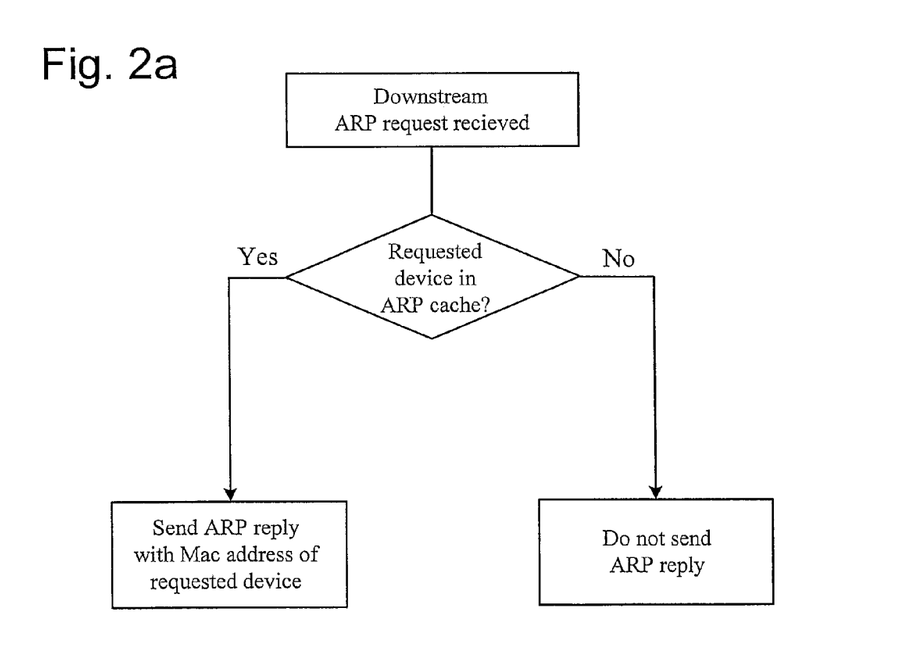
Figure 2B:
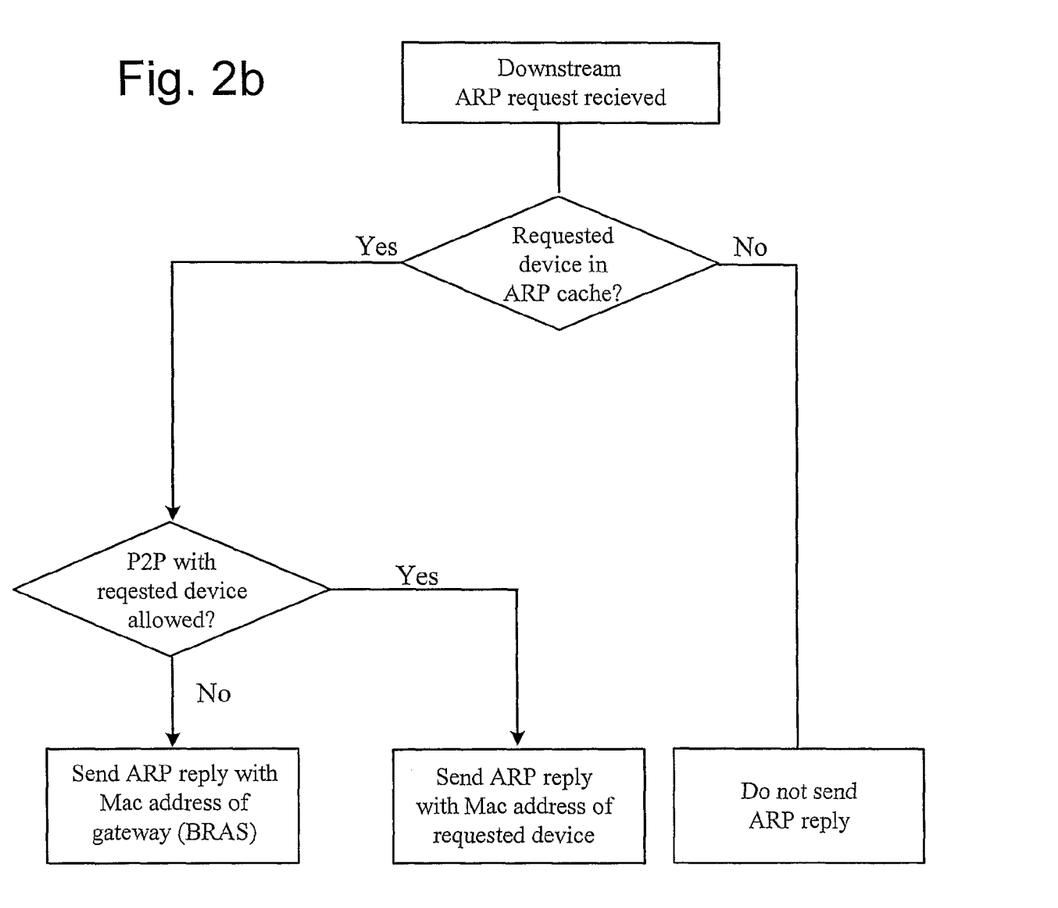

When an Access node AN intercepts a downstream ARP request the Downstream ARP Proxy checks its ARP cache for the requested <IP address, MAC address> pair. Device 1 may send an ARP request to discover the MAC address of Device 2, AN2 will intercept the request and check its ARP cache. This is described in FIG. 2.

FIG. 2a shows one example of how the Downstream ARP Proxy can handle the ARP requests in its Access Node. In the figure is shown that a Downstream ARP request has been received from one of the devices in the network. The ARP request asks for a specific device in order to obtain the MAC address of the device. In the aggregation network access nodes there is a common ARP cache, which cache actually is a look-up table listing the <IP address, MAC address> of the device in the actual network to be used by the access nodes of the network. The receiving device checks, i.e. the other AN-s in the aggregation network check in their respective ARP cache if the requested device is entered there. In case the requested device is not found—no ARP reply will be sent. That means that any Access Node connected to the Aggregation network, which is not connected to the requested end-user will not respond, i.e. no traffic. Thus, if the ARP cache does not contain an entry corresponding to requested device that device is not connected to that access node, and thus no ARP reply should be sent If the requested device is found, i.e. an entry is found in the ARP cache of one of the Access Nodes belonging to the Aggregation Network there are two alternatives.

In the first alternative (shown in FIG. 2a) an ARP reply with MAC address of requested device is sent. This is a straightforward routine which then allows the requesting device to directly communicate with the requested device without using the route via the BRAS in FIG. 1.

The second alternative (shown in FIG. 2b) allows for a control with the access node AN of the requested device if P2P traffic is allowed with the requested device. "Yes" will result in an ARP reply with MAC address of requested device. "No" will result in an ARP reply sent with the MAC address of the gateway (BRAS) through which the communication then will be possible between the devices.

This latter is similar to a MAC forced Forwarding with the only difference being that the Downstream ARP Proxy sends the reply and not an upstream ARP proxy.

In the access node the <IP address, MAC address>—pair of the end-user device is learnt via snooping of the DHCP replies. DHCP stands for Dynamic Host Configuration Protocol, and this functionality is today commonly implemented in the access node to prevent MAC and IP spoofing from the customer side and the downstream ARP Proxy can thus easily make user of this information.

For alternative 2 the access node must learn which <IP address, MAC address> pairs are allowed to perform P2P communication. This must be configured in the access node by an external entity, e.g. through an SNMP message/instruction (Simple Network Management Protocol), CLI (Common Language Infrastructure), or some web-based interface.

In order to further optimize the solution the use of an Upstream ARP Proxy and filtering in the Access Node can be used. I.e. this is a control mechanism which works to check if the user device that sent the ARP request is allowed access to local P2P. This first checking takes place in the Access Node of the user device, i.e. the device sending the request.

It is noted that the Downstream ARP proxy described above stands by itself. However, the Upstream ARP proxy, described here below, needs the downstream ARP proxy to be present. The Upstream proxy essentially is a further control that no unnecessary traffic is sent out on the aggregation network.

Figure 3A:
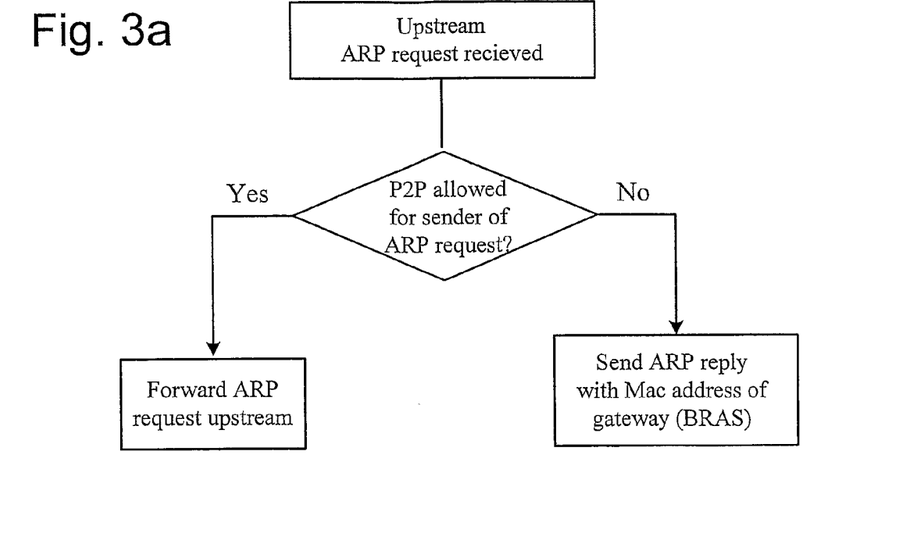
Figure 3B:
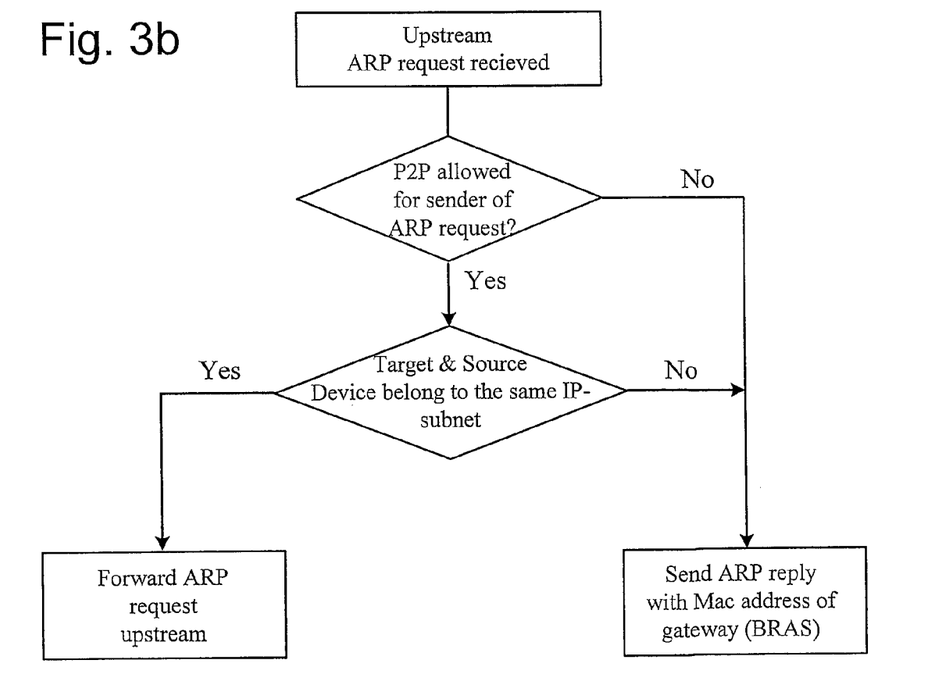

Different alternatives for this procedure are shown in FIG. 3a, and FIG. 3b respectively.

In FIG. 3a is shown the case when an end user device sending out ARP request and a check is made if the requesting device allowed P2P. If he is not allowed to do so an ARP reply is sent back containing the MAC address of the BRAS, similar to MAC-Forced Forwarding. For example when device D1 in FIG. 1 sends an ARP request AN1 will intercept the request to perform the described check. If P2P is allowed for the requesting device the ARP reply is forwarded upstream.

Figure 1:
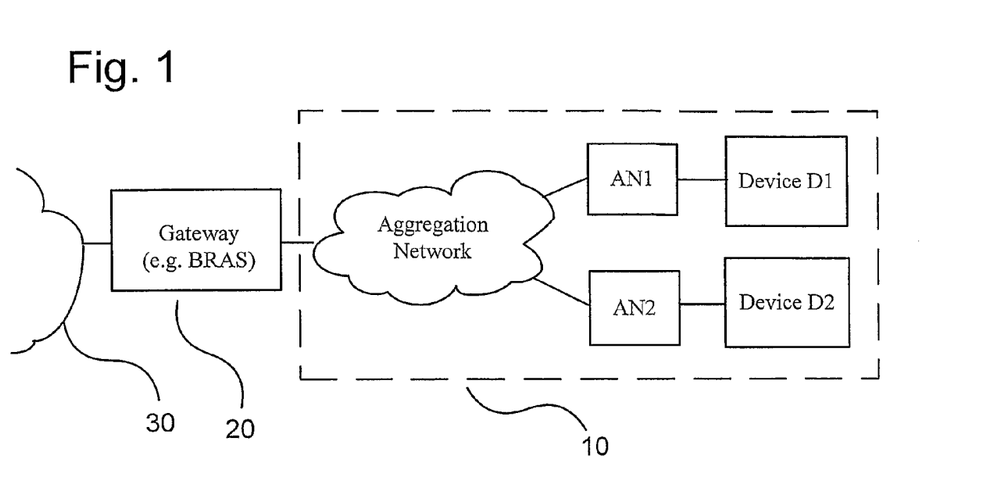
FIG. 1 shows an example access network where the method according to the invention is applicable.

In FIG. 3b is shown that a further check may be made in the Upstream ARP proxy as to whether the target and the source device (requesting device) belong to the same IP-subnet (the Aggregation Network in FIG. 1).

If the answer is "No" the response will be an ARP reply with the Mac Address of the gateway (BRAS), and in case the answer is "Yes" the ARP request is forwarded upstream.

If the subnet check is made and if the target end user device is present on the IP subnet a further control may be made as to whether P2P is allowed with the requested (target) device or not. If P2P is allowed the ARP request is forwarded upstream to be handled by the downstream ARP proxy of the destination end user. If P2P is not allowed an ARP reply with Mac address of the gateway (BRAS) is sent. This is further illustrated in FIG. 4.

If the check is not undertaken the ARP request is forwarded upstream to be handled by the downstream ARP proxy of the AN, that has the target end user connected to it.

The control whether the device is present on the subnet is thus not necessary, only an extra measure to hinder unnecessary traffic on the net.

For security there are a number of measures/filters that may be used according to the invention.

Filter 1. The access node of the sending device may also be allowed to "snoop" ARP replies and associate the MAC and/or IP address of the sender (source device) and the target device with each other in a table, named P2P table. The access node of the sending device may then filter frames so that upstream frames are only forwarded if they are either destined to a network gateway (BRAS) or destined to an end-user device (target device) where an entry in the P2P table exists for that <Source device, Target device> pair. All other frames are dropped.

Filter 2. In a further embodiment of the method according to the invention is arranged such as to be compatible with VMAC presented in a co-pending patent application "Ethernet Address Management System" P17938, for guaranteeing MAC address uniqueness in the aggregation network. This also prevents end-users from knowing each other's real MAC addresses. VMAC stands for Virtual Media Access Control Address. The destination MAC address that the end-users will use for communication with other devices located with the same network will thus always be the VMAC.

DHCP Option 82, stands for Dynamic Host Configuration Protocol. The Dynamic Host Configuration Protocol is a draft standard protocol and provides a framework for passing configuration information to hosts on a TCP/IP network. The option 82 can be used for traceability. However, the invention requires that the Access Nodes log the IP traffic properly in order to make this work since the traffic is not sent via the gateway BRAS. Traceability could also be provided using VMAC. The invention then requires that the Access Node logs the Ethernet traffic, i.e. the traffic on the aggregation network In FIG. 1.

Filter 3. The invention is compatible with the IP and MAC address anti-spoofing filters implemented in the Access Node.

The invention is mainly suited for Best Effort peer-to-peer traffic. There exists ways of making sure that the peer-to-peer traffic doesn't steal, most of the capacity from other services present on the net. For traffic with higher priority using the p-bits (specified in IEEE 802.1D) in the Ethernet frame easily solves this. High priority frames are simply put in a higher priority class than the Best Effort traffic.

The problem is how to handle the Best Effort traffic in a fair way. This is especially true for P2P as P2P can easily use up most of the bandwidth at disposal.

According to the invention there are two solutions to this.
1. One solution is to introduce two classes of Best Effort traffic. Traffic from a user is put into the "higher priority" Best Effort class up to a determined level. All the traffic above that limit is put in the lower Best Effort class. If a switch gets congested it will first drop the packets in the lower Best Effort class. This can today be handled by the new revision of IEEE 802.1Q VLAN standard (VLAN stands for Virtual Local Area Network) and in the 802.1ad "Provider Bridges" using drop precedence.
2. Another solution is just to put the local P2P traffic in a lower class than other best effort traffic. However this will not solve the general case when the P2P traffic is not local within the access network, i.e. at least two networks a connected and a VLAN is set up which looks as an aggregation network. However this alternative solves the problem of local P2P, but does not solve the fairness problem as the P2P traffic often may originate from an external source. The solution 1 solves both these problems and this is preferred.

A further embodiment according to the invention is peer-to-peer VLAN, where VLAN stands for Virtual Local Area Network). A VLAN may be seen as a logical network on top of at least one physical network. A logical VLAN is identified using a so called VLAN-ID, which constitutes a part of the Ethernet header. VLAN makes it possible to design several logical networks on top of the same infra-structure. Two devices belonging to the same physical network but to different VLAN-id:s cannot communicate on the Ethernet layer (Layer 2 in the OSI-stack) all the traffic between such devices must be routed on layer 3 (IP) e.g. via the BRAS. In order to identify to which VLAN a packet should be delivered one looks at the VLAN-ID in the packet header.

The access nodes are responsible for tagging all upstream local P2P traffic with the Local P2P VLAN tag. The access node knows the Mac addresses to all gateways, e.g. BRAS. If it receives a frame not destined to any of these gateways, and the frame passes the filters 1-filters 3 above (if enabled) the access node simply adds a P2P VLAN tag to the frame and forwards it onto the P2P VLAN. In this way the service access constrain property described above can be met.

Figure 4:
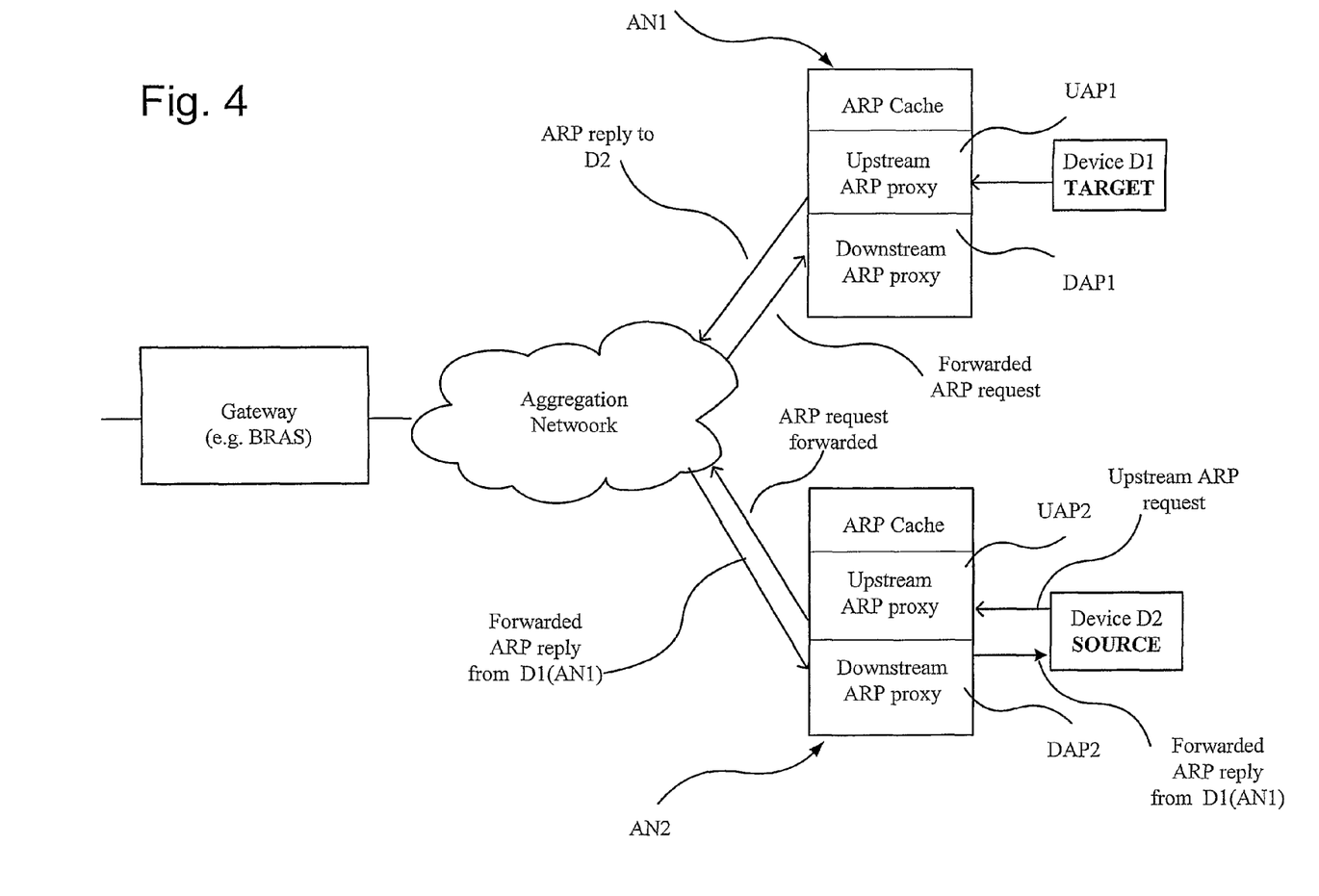
FIG. 4 shows the flow of the traffic for the ARP request and reply

Finally, in FIG. 4 it is illustrated how the Upstream and Downstream ARP proxies are used together to allow local P2P communication between Device D2, source device, and Device D1, target device. A scenario may be envisioned in which D2 wants to communicate with D1, e.g., to share files, perform a video conference or play a network game.

The Source device, D2, starts by sending an ARP request to ask for the MAC address to reach D1. The Upstream ARP proxy in Access Node 2, AN2, belonging to the source device D2, intercepts this request and performs the checks according to either FIG. 3*a* or FIG. 3*b*. If local peer-to-peer communication is granted by this Upstream ARP proxy the ARP request is forwarded upstream onto the aggregation network. If the request is not granted, an ARP reply is sent back to D2 containing the MAC address of the IP gateway (BRAS).

The ARP requests forwarded upstream by the Upstream ARP proxy of AN2 in this case will be intercepted by all other Access Nodes' Downstream ARP proxies which belong to the same IP-net, i.e. to the same Layer 2 broadcast domain. In FIG. 4 this implies that the ARP request is intercepted by the Downstream ARP proxy in AN1, the access node of the target device. It performs the checks according to FIG. 2*a* and FIG. 2*b*. If local peer-to-peer is granted the Downstream ARP proxy sends an ARP reply back to D2 containing the MAC address of D1, and associates D1 and D2 with each other and stores this in its P2P Table.

If local peer-to-peer is not granted, an ARP reply is sent back to D2 containing the MAC address of the IP gateway (BRAS), and no association is made. The ARP reply from AN1 is snooped by AN2. AN2 uses the information provided in the ARP reply to associate D1 and D2 with each other and stores this in its P2P table. Finally, the ARP reply is forwarded back to D2. Communication between D2 and D1 can now start.

In AN1 and AN2 all traffic between D2 and D1 are checked against the P2P table to ensure that the traffic between D1 and D2 is indeed allowed. If an entry exists for the particular <Source device, Target device> pair, the traffic is allowed to pass. In this case AN1 and AN2 have each stored an entry for the <D1, D2> pair and thus the traffic is allowed to pass these access nodes. If not, the traffic would have been dropped.

The method for association may also be described as follows:

The method according to the invention for association of end devices using the Upstream ARP Proxy and the Downstream ARP Proxy according to the invention comprises the following steps:

source device (D2) sends an ARP request for the MAC address of target device (D1);

the Upstream ARP Proxy (UAP2) of Access Node (AN2) belonging to source device (D2) intercepts the request and performs the tests according to claims 3 or 4;

if local P2P is granted the Upstream ARP Proxy (UAP2) forwards the ARP request upstream onto the aggregation network, said request intercepted by all Downstream ARP proxies on the Access Nodes of the same IP-net;

the Downstream ARP proxy (DAP1) of the target device (D1) intercepting the ARP request performs the tests according to claims 1 or 2;

if local P2P is granted, the Downstream ARP proxy (DAP1) sends ARP reply to D2, said response comprising MAC address of D1, D1 and D2 are associated and the Downstream ARP proxy (DAP1) stores this in the P2P-table of AN1;

said ARP reply from AN1 is snooped by AN2, D1 and D2 are associated and the Downstream ARP proxy (DAP2) stores this in the P2P-table of AN2; the ARP reply is forwarded to the source device D2 and communication is set up.

As will be recognized by those skilled in the art, the innovative concepts described in the present application can be modified and varied over a wide range of applications. Accordingly, the scope of patented subject matter should not be limited to any specific exemplary teaching discussed above, but instead defined by the following claims

The invention claimed is:

1. A method for peer-to-peer communication in an aggregation network, said aggregation network having a plurality of end user devices, said end user devices being capable of acting as a source device or a target device, wherein each end user device is connected to said aggregation network through one of a plurality of access nodes, and a gateway provides for communication outside of the aggregation network, said method comprising the steps of:

implementing a Downstream Address Resolution Protocol (ARP) proxy and a respective ARP Cache in each of the access nodes, said ARP Cache storing an <Internet Protocol (IP) address, Media Access Control (MAC) address> pair for each end user device in the aggregation network, and storing a <source device, target device> pair for each pair of end user devices for which peer-to-peer communications are allowed;

intercepting by the Downstream ARP proxy in one of the access nodes, a Downstream ARP request from a source device for a target end user device;

determining by the Downstream ARP proxy, whether an <IP address, MAC address> pair for the target end user device is stored in the ARP Cache;

when an <IP address, MAC address> pair for the target end user device is stored in the ARP Cache, determining whether a <source device, target device> pair for the source device and the target device is stored in the ARP Cache;

sending by the Downstream ARP proxy, an ARP reply to the source device only when an <IP address, MAC address> pair for the target end user device and a <source device, target device> pair for the source device and the target device are stored in the ARP Cache, said ARP reply including the MAC address of the target device; and when an <IP address, MAC address> pair for the target end user device is not stored in the ARP Cache, sending no reply by the Downstream ARP proxy.

2. The method according to claim 1, wherein upon determining that an <IP address, MAC address> pair for the target end user device is stored in the ARP Cache, but a <source device, target device> pair for the source device and the target device is not stored in the ARP Cache, the step of sending the ARP reply to the source device includes:

sending by the Downstream ARP proxy, a different ARP reply to the source device containing the MAC address of the aggregation network gateway.

3. A method for peer-to-peer communication in an aggregation network, said aggregation network having a plurality of end user devices, said end user devices being capable of acting as a source device or a target device, wherein each end user device is connected to said aggregation network through one of a plurality of access nodes, and a gateway provides for communication outside of the aggregation network, said method comprising the steps of:

implementing an Upstream Address Resolution Protocol (ARP) proxy, a Downstream ARP proxy, and an ARP Cache in each access node, said ARP Cache storing an <Internet Protocol (IP) address, Media Access Control (MAC) address> pair for each end user device in the aggregation network, and storing a <source device, target device> pair for each pair of end user devices for which peer-to-peer communications are allowed;

intercepting by the Upstream ARP proxy in a first access node, an ARP request from a source device requesting the Media Access Control (MAC) address of a target device;

determining by the Upstream ARP proxy whether peer-to-peer communication is allowed for the source device by determining whether a <source device, target device> pair for the source device and the target device is stored in the Upstream ARP proxy's ARP Cache;

if so, forwarding by the Upstream ARP proxy, the ARP request upstream onto the aggregation network;

intercepting the ARP request by all of the Downstream ARP proxies in the access nodes of the same IP-subnet;

determining by the Downstream ARP proxy in the access node serving the target device, whether an <IP address, MAC address> pair for the target end user device is stored in the access node's ARP Cache, and whether a <source device, target device> pair for the source device and the target device is stored in the Downstream ARP proxy's ARP Cache;

sending by the Downstream ARP proxy, an ARP reply to the source device only when an <IP address, MAC address> pair for the target device and a <source device, target device> pair for the source device and the target device are stored in the Downstream ARP proxy's ARP Cache, said ARP reply including the MAC address of the target device; and when an <IP address, MAC address> pair for the target end user device is not stored in the ARP Cache, sending no reply by the Downstream ARP proxy.

4. A system for peer-to-peer communication in an aggregation network, said aggregation network having a plurality of end user devices, said end user devices being capable of acting as a source device or a target device, wherein each end user device is connected to said aggregation network through one of a plurality of access nodes, and a gateway provides for communication outside of the aggregation network, said system comprising:

an Address Resolution Protocol (ARP) Cache in each of the access nodes, said ARP Cache storing <Internet Protocol (IP) address, Media Access Control (MAC) address> pairs for end user devices in the aggregation network, and storing a <source device, target device> pair for each pair of end user devices for which peer-to-peer communications are allowed;

a Downstream ARP proxy in each of the access nodes, said Downstream ARP proxy being controlled by a processor executing computer program instructions, wherein the processor causes the Downstream ARP proxy to:

intercept a Downstream ARP request from a source device for a target end user device;

determine whether an <IP address, MAC address> pair for the target end user device is stored in the ARP Cache;

determine whether a <source device, target device> pair for the source device and the target device is stored in the ARP Cache;

send an ARP reply to the source device only when an <IP address, MAC address> pair for the target end user device and a <source device, target device> pair for the source device and the target device are stored in the ARP Cache, said ARP reply including a MAC address of the target device; and responsive to a determination that an <IP address, MAC address> pair for the target end user device is not stored in the ARP Cache, send no reply by the Downstream ARP proxy.

5. The system according to claim 4, wherein the Downstream ARP proxy is configured to send the ARP reply to the source device by sending a different ARP reply to the source device containing the MAC address of the aggregation network gateway in response to a determination that an <IP address, MAC address> pair for the target end user device is stored in the ARP Cache, but a <source device, target device> pair for the source device and the target device is not stored in the ARP Cache.

6. A system for peer-to-peer communication between end user devices within an aggregation network, said system providing peer-to-peer communication without requiring traffic to pass through a network gateway, wherein end user devices connect through access nodes to the aggregation network, said system comprising:

an Upstream Address Resolution Protocol (ARP) proxy, a Downstream ARP proxy, and an ARP Cache in each access node, said ARP Cache storing an <Internet Protocol (IP) address, Media Access Control (MAC) address> pair for each end user device in the aggregation network, and storing a <source device, target device> pair for each pair of end user devices for which peer-to-peer communications are allowed;

wherein each Upstream ARP proxy is controlled by a processor executing computer program instructions, wherein the processor causes the Upstream ARP proxy to:

receive an Upstream ARP request from a source end user device requesting the MAC address of a target device;

determine whether peer-to-peer communication is allowed for the source device by determining whether a <source device, target device> pair for the source device and the target device is stored in the Upstream ARP proxy's ARP Cache; and forward the request upstream only if peer-to-peer communications are allowed with the source device;

wherein each Downstream ARP proxy is controlled by a processor executing computer program instructions, wherein the processor causes the Downstream ARP proxy to intercept a Downstream ARP request for a target device; and wherein the Downstream ARP proxy in the access node serving the target device is configured to:

determine whether an <IP address, MAC address> pair for the target end user device is stored in the access node's ARP Cache, and whether a <source device, target device> pair for the source device and the target device is stored in the Downstream ARP proxy's ARP Cache; and send an ARP reply to the source device only when an <IP address, MAC address> pair for the target device and a <source device, target device> pair for the source device and the target device are stored in the Downstream ARP proxy's ARP Cache, said ARP reply including the MAC address of the target device.

* * * * *